United States Patent [19]

DeMasters et al.

[11] Patent Number: 5,431,866
[45] Date of Patent: Jul. 11, 1995

[54] METHOD AND APPARATUS FOR POSITIONING A PIPE

[75] Inventors: Jimmie G. DeMasters, Wylie, Tex.; Leonard A. Fears, Bixby, Okla.

[73] Assignee: Phillips Petroleum Company, Bartlesville, Okla.

[21] Appl. No.: 187,943

[22] Filed: Jan. 27, 1994

[51] Int. Cl.⁶ ...................... B29C 47/04; B29C 47/92
[52] U.S. Cl. ...................... 264/40.1; 101/6; 101/DIG. 39; 156/244.16; 264/40.2; 264/132; 264/173; 356/435; 425/131.1; 425/140
[58] Field of Search ............... 156/244.16, 144.17; 264/40.1, 1.5, 40.2, 132, 173; 356/435; 378/59; 425/131.1, 135, 140; 101/6, 7, 23, 38.1, DIG. 39

[56] References Cited

U.S. PATENT DOCUMENTS

| | | | |
|---|---|---|---|
| 3,497,304 | 2/1970 | Berube | 356/435 |
| 3,600,918 | 8/1971 | Lemelson | 264/132 |
| 3,797,720 | 3/1974 | Gaudion | 264/40.1 |
| 3,972,761 | 8/1976 | Landgraf et al. | 156/187 |
| 4,178,200 | 12/1979 | Hakert et al. | 156/187 |
| 4,311,905 | 1/1982 | Ries et al. | 378/59 |
| 4,790,975 | 12/1988 | Jarvenkyla et al. | 264/173 |
| 4,906,170 | 3/1990 | Nelson et al. | 264/132 |
| 5,094,600 | 3/1992 | Sikora | 264/40.1 |
| 5,223,852 | 6/1993 | Oresti et al. | 264/132 |

FOREIGN PATENT DOCUMENTS 2613981 10/1988 France .................. 264/1.5

Primary Examiner—Mathieu D. Vargot
Attorney, Agent, or Firm—Ryan N. Cross

[57] ABSTRACT

A method and apparatus for countering the rotation of a striped pipe during extrusion is provided. A sensor for detecting the stripe sends a signal to a pipe rotating means which, in response to the signal, rotates the pipe to correct any turning occurring during extrusion, forming and cooling of the pipe.

7 Claims, 5 Drawing Sheets

METHOD AND APPARATUS FOR POSITIONING A PIPE

BACKGROUND OF THE INVENTION

In one aspect, the invention relates to a method for positioning a pipe. In another aspect, the invention relates to an apparatus for positioning a pipe.

In the extrusion of plastic pipe, it is sometimes desirable to co-extrude a stripe of differing color into the plastic pipe during the extrusion process. Thus, a black pipe might be extruded with a yellow stripe, or a white pipe might be extruded with a black stripe. As the pipe travels downstream from the extruder, it has a tendency to rotate. If printing occurs downstream from the pipe extruder, the printing can stray over the surface of the pipe and across the stripes due to the rotation of the pipe. It would, therefore, be desirable to develop a method and apparatus for correcting for the rotational movement of the pipe in order to obtain a more linear print upon the pipe surface.

SUMMARY OF THE INVENTION

It is, therefore, an object of the present invention to provide an apparatus and method which can correct for the rotation of the pipe as it travels downstream from the extruder.

It is a further object of the invention to provide an apparatus and method which will produce a pipe with printing on it which runs extensively linearly along the surface of the pipe and extensively parallel to the longitudinal axis of the pipe.

The above objects are realized in a process wherein a pipe having a longitudinal stripe is passed through a viewing zone having at least one sensor capable of detecting the stripe such that when the sensor detects the stripe, the sensor generates a signal and transmits the signal from the sensor to a pipe rotating means in contact with said pipe, wherein in response to the signal, the pipe rotating means rotates the pipe so that the sensor no longer detects the stripe.

According to another aspect of the invention, there is provided an apparatus for rotating a pipe of a first color having a stripe of a second color. The apparatus comprises a pipe rotating means for rotating the pipe and a sensor means for detecting the stripe and transmitting a signal to the pipe rotating means such that when the sensor detects the stripe, the rotating means rotates the pipe in response to the signal so that the sensor no longer detects the stripe.

DETAILED DESCRIPTION OF THE INVENTION

The invention will be described in terms of an embodiment wherein a black plastic pipe is extruded having a yellow stripe; however, it should be understood that within the scope of the appended claims, the invention may be practiced otherwise than as specifically described.

Figure 1:
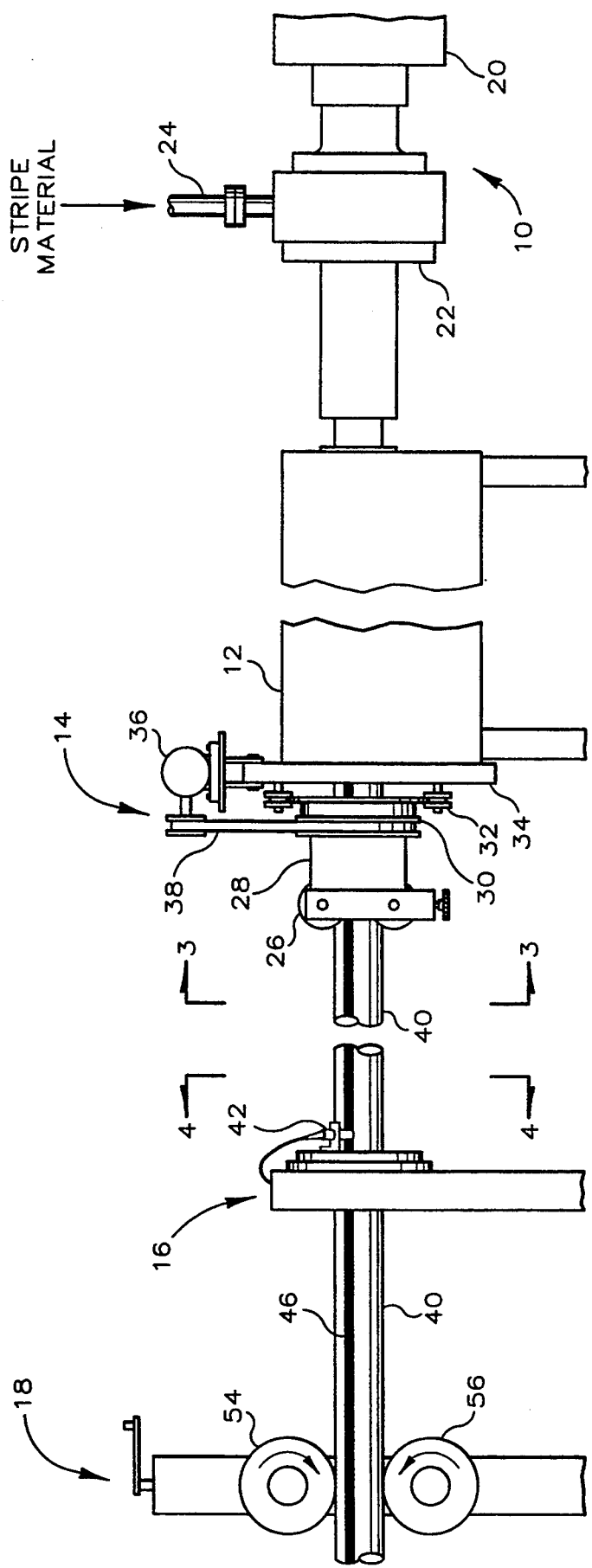
FIG. 1 is an elevation view illustrating a pipe extruding and printing apparatus which utilizes the current invention.

Referring now to the drawings, FIG. 1 illustrates an extrusion line utilizing the current invention. The extrusion line of FIG. 1 comprises an extrusion means 10, a cooling means 12, a pipe rotating means 14 contained in an aligning zone, a sensor means 16 contained in a viewing zone and a printing means 18.

Extrusion means 10 has a main extruder 20 which receives solid plastic pellets. The extruder melts the plastic pellets (resin or polymer) and pumps the melt (molten plastic) through a die hole and into die 22. Die 22 also receives a melt of a second color from a supplementary extruder (not shown) through conduit 24. The die 22 has the appropriate configuration so that the pipe formed therein comprises a black pipe having one or more yellow stripes. For purposes of explanation, the pipe in this embodiment will be described as a black plastic pipe having two yellow stripes.

The pipe formed in die 22 then enters cooling means 12. Cooling means 12 comprises a sizing and cooling trough or rolls where the correct size and shape of the pipe are developed.

Figure 2:
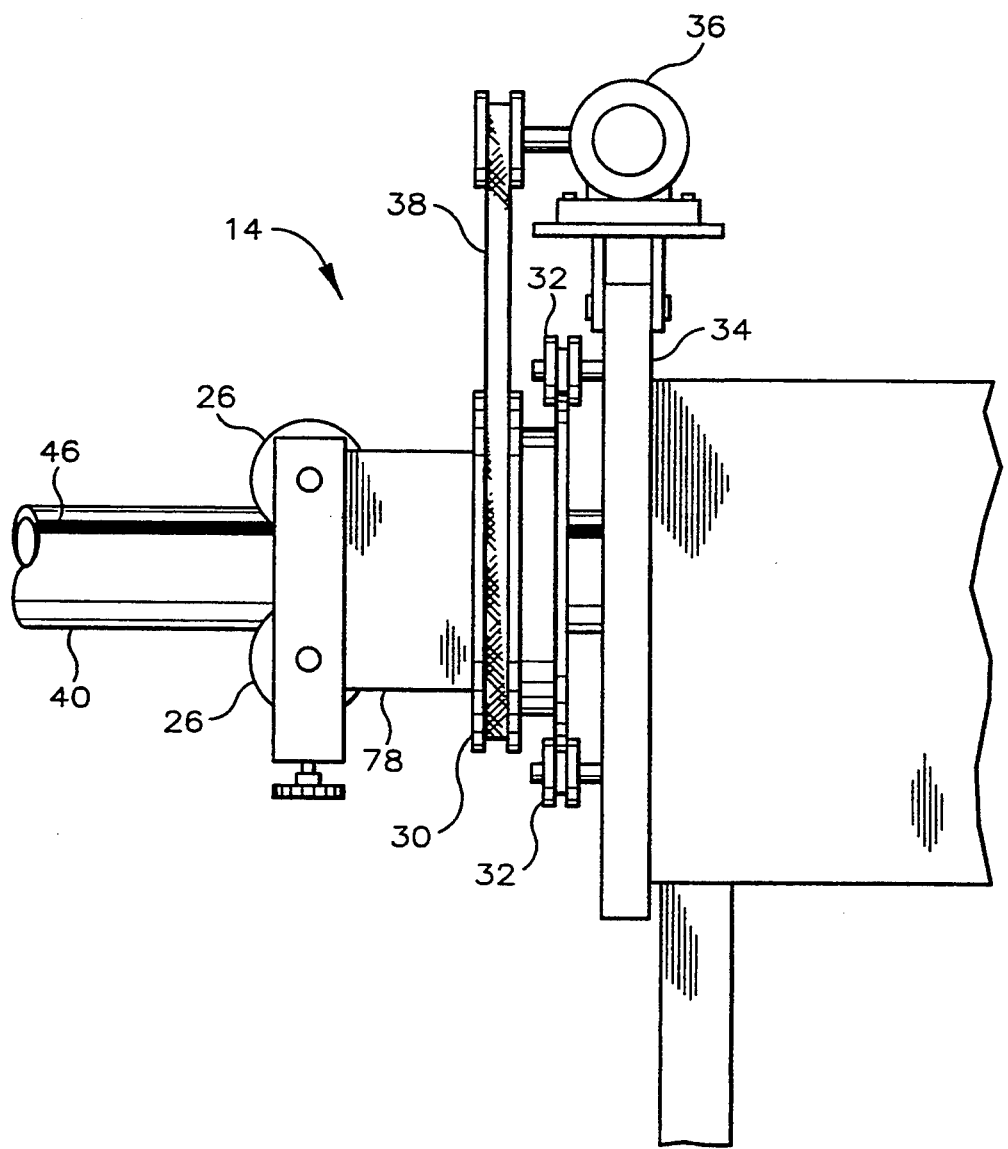
FIG. 2 is an enlarged elevation view more clearly illustrating the pipe rotating means utilized in the apparatus of FIG. 1.
Figure 3:
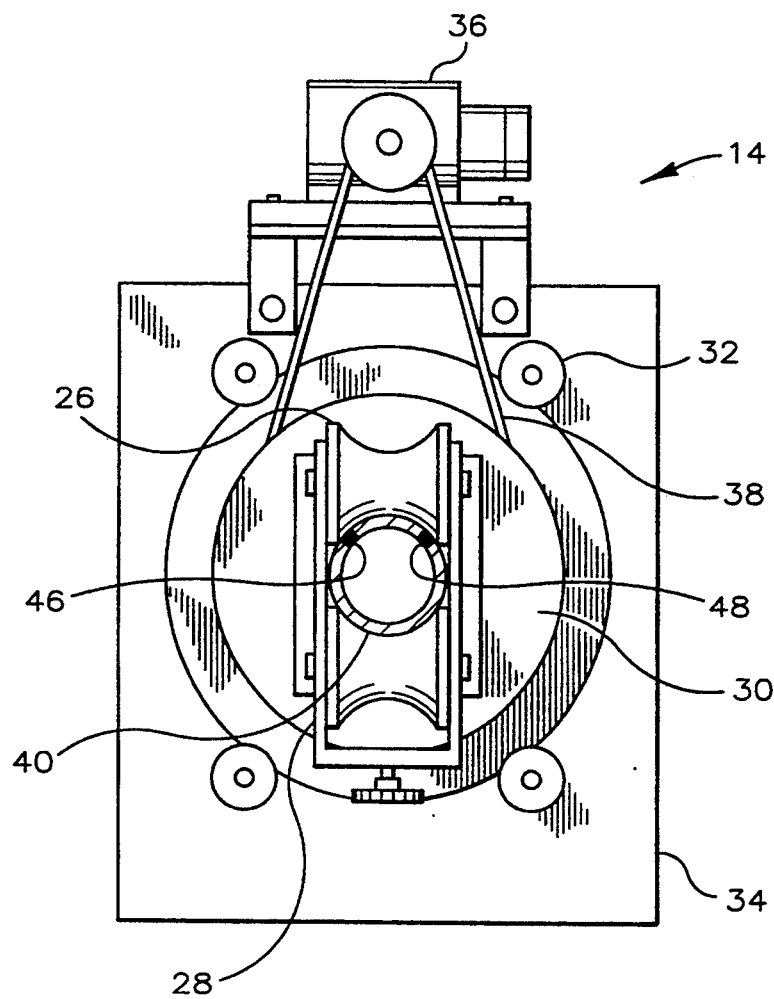
FIG. 3 is a view of the pipe rotating means of the apparatus of FIG. 1 taken along line 3—3.

Next, the newly formed product enters pipe rotating means 14, which can be more clearly seen from FIG. 2 and FIG. 3. Rotating means 14 is comprised of guide rollers 26 mounted in frame 28 which is in turn mounted on rotatable table 30. Rotatable table 30 is held in place by rollers 32 which are mounted onto base 34 which is in turn mounted onto the cooling means. Rotatable table 30 can be rotated by means of variable speed motor 36 which is mounted on base 34 and connected to table 30 by means of belt 38.

Figure 4:
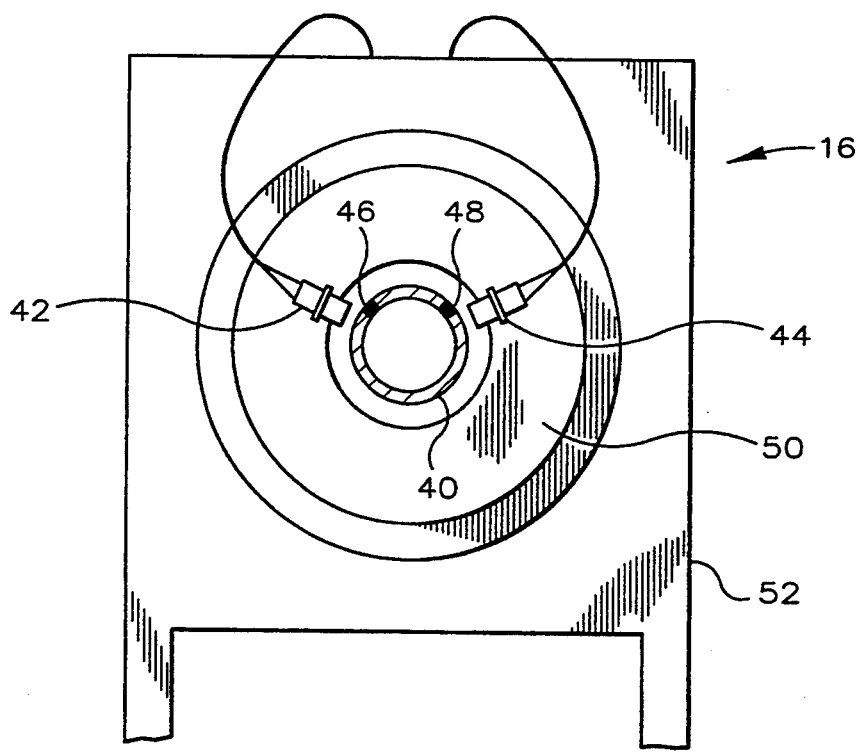
FIG. 4 is a view of the sensor means of the apparatus of FIG. 1 taken along line 4—4.

Upon exiting rotating means 14, pipe 40 is received by sensor means 16, which can be better seen from FIG. 4. Sensor means 16 has dual sensors 42 and 44. Sensors 42 and 44 are mounted to each side of stripes 46 and 48 such that if pipe 40 rotates clockwise, sensor 44 will detect stripe 48 and if pipe 40 rotates counterclockwise, sensor 42 will detect stripe 46. Sensors 42 and 44 are mounted on plate 50, which is in turn mounted on base 52. After having passed through sensor means 16, pipe 40 passes to printing means 18. Printing means 18 comprises printing wheel 54 for printing onto the pipe and guide wheel 56 for guiding and supporting the pipe.

Generally, the extrusion line will also have a puller (not shown), which is often a pair of motor-driven, rubber-covered rolls. The puller is typically located after cooling means 12 and before printing means 18. It is the puller which pulls the molten resin from the die through the cooler.

In operation, a resin of a first color, in this embodiment a black resin, is extruded in extruder 20 and a resin of a second color, in this embodiment a yellow resin, is extruded in a supplementary extruder. Both resins enter die 22 and are shaped, sized and cooled within die 22 and cooling means 12. The formed black pipe 40, having two yellow stripes 46 and 48 is drawn from cooling means 12 through pipe rotating means 14 and then passes through sensor means 16. Sensor means 16 contains optical sensors 42 and 44 which are capable of detecting the color difference between the black pipe and the yellow stripe. In sensor means 16, sensors 42 and 44 are each in a passive mode until yellow stripe 46 or yellow stripe 48 passes underneath sensor 42 or sensor 44, respectively. At which time, the sensor detecting the yellow stripe sends a signal which activates motor 36 of rotating means 14. The activated motor 36 will then turn rotatable table 30 by means of belt 38. Thus, frame 28 and guide rollers 26, which are mounted to rotatable table 30, will also turn.

Guide rollers 26, which snugly hold pipe 40, share a common axis and are free to turn about this axis to allow pipe 40 to pass through pipe rotating means 14 in a direction parallel to the longitudinal axis of pipe 40. The activation of motor 36 will cause the guide rollers 26 to rotate in a direction perpendicular to the common axis of guide rollers 26 and perpendicular to the longitudinal axis of pipe 40; thus, causing pipe 40 to rotate about its longitudinal axis. The direction that the pipe is rotated will be determined by whether sensor 42 or sensor 44 activates motor 36. If, during extrusion, the pipe rotates in a counterclockwise direction (as viewed from FIG. 4), sensor 42 will detect stripe 46 and send a signal to rotating means 14 to activate motor 36 such that the rotating means 14 will correct for the rotation of the pipe by turning the pipe in a clockwise direction. When the pipe has been turned by rotating means 14 sufficiently so that sensor 42 no longer detects stripe 46, sensor 42 will cease to send its signal, and motor 36 will deactivate. If, during extrusion, pipe 40 rotates in a clockwise direction, then sensor 44 will detect stripe 48 and send a signal to rotating means 14 so that the rotating means rotates the pipe in a counterclockwise direction to correct for the pipe's rotation during extrusion. Upon sensor 44 no longer detecting stripe 48, the signal will cease and so will the rotation of the pipe due to rotation means 14.

After passing through sensor means 16, the pipe passes through printing means 18 wherein the desired print is printed on the pipe by printing wheel 54. The resulting pipe has printing on its surface which runs extensively linear and extensively parallel to the longitudinal axis of the pipe. Moreover, the print on the pipe stays in the region between the two stripes and does not stray onto the stripes.

Figure 5:
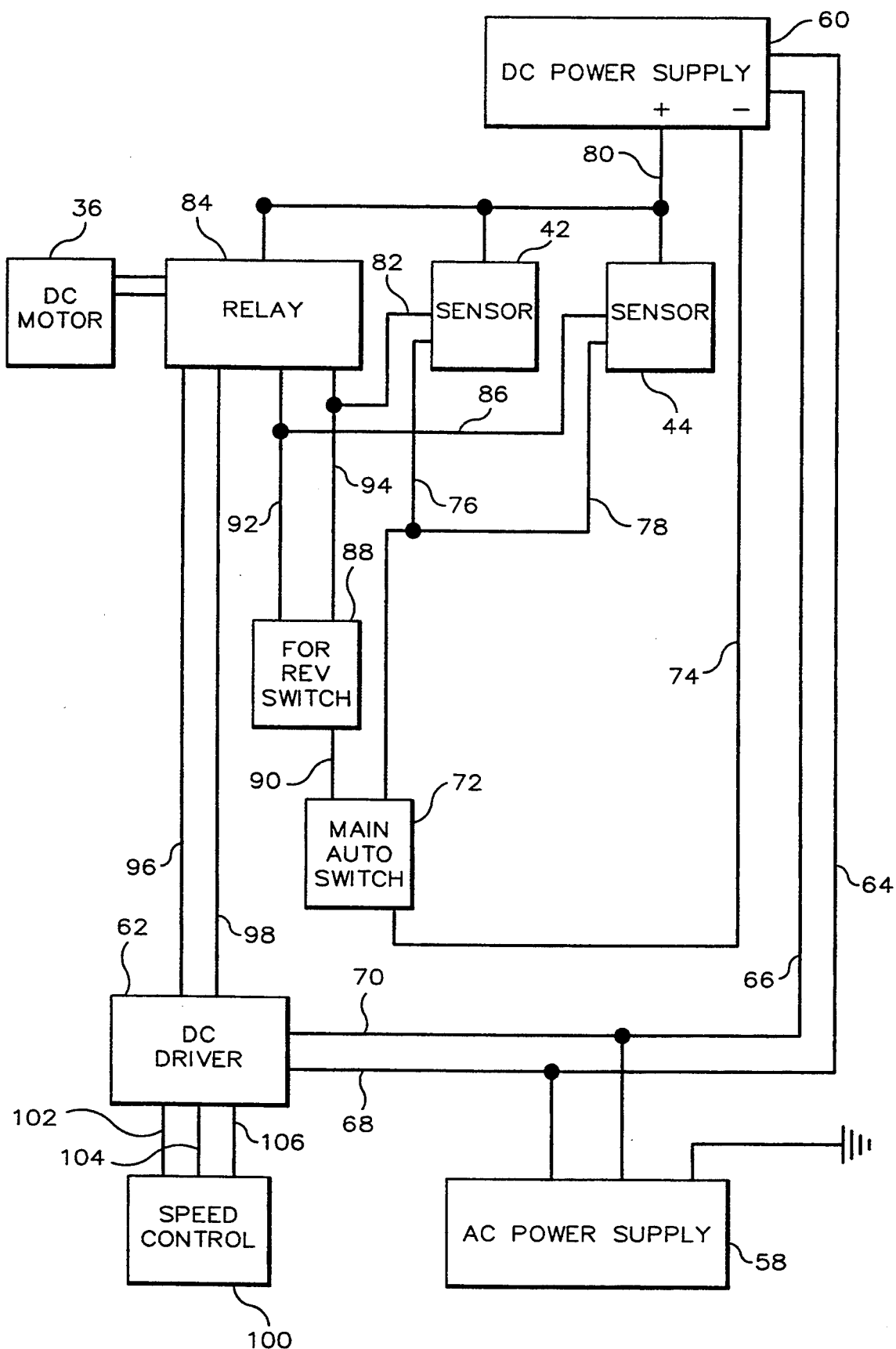
FIG. 5 is a schematic block diagram of an electrical system

Turning now to FIG. 5, there is provided a simplified block diagram of an electrical system for operating the apparatus of the current invention. AC power supply 58 powers the electrical system by supplying power to DC power supply 60 through wires 64 and 66 and to DC driver 62 through wires 68 and 70. DC power supply 60 is coupled to manual/auto switch 72 via wire 74. Manual/auto switch 72 is coupled on the automatic side via wire 76 to sensor 42 and via wire 78 to sensor 44. During normal operation, when neither sensors 42 nor 44 detect a yellow stripe, current entering sensors 42 and 44 pass through wire 80 to the DC power supply 60. When sensor 42 detects a stripe, it diverts current to wire 82 which delivers current to relay 84. Relay 84, in turn, activates DC motor 36 such that it will rotate table 30 and, thus, turn guide rollers 26 and, hence, pipe 40 in a first direction. Current entering relay 84 passes back to DC power supply via conduit 80. When sensor 44 detects a stripe, it diverts current to relay 84 via conduit 86. Current entering relay 84 via conduit 86 activates DC motor 36 such that it turns table 30 and, thus, turns guide rollers 26 and pipe 40 in a second direction opposite of the first direction. Thus, relay 84 acts as a controller means to determine which direction the pipe is rotated based on the signals received from the sensors.

If manual/auto switch 72 is switched to the manual mode, current is diverted through forward/reverse switch 88 via wire 90. Forward/reverse switch 88 connects in the forward mode to wire 86 via wire 92 and connects in the reverse mode to wire 80 via wire 94. Thus, when manual/auto switch 72 is in the manual mode, the direction which the DC motor is driven can be determined by switch 88.

Finally, DC driver 62 is connected to relay 84 via wires 96 and 98 and to speed control 100 via wires 102, 104 and 106. Thus, through speed control 100 and DC driver 62 the speed of the DC motor can be controlled.

In summary, the sensor means acts to detect any rotation in the pipe which might cause the print printed onto the pipe by the printing wheel to wander over the diameter of the pipe and sends a signal to the pipe rotating means to correct for the rotation of the pipe.

Reasonable variation and modification are possible within the scope of the disclosure, drawings, and appended claims, without departing from the spirit of the invention.

That which is claimed is:

1. A process comprising:
   a) extruding a first resin material having a first color and a second resin material having a second color in an extruder to form a substantially longitudinal pipe such that it is composed of said first resin material and has a substantially longitudinal stripe composed of said second resin material and, thereafter, cooling said pipe;
   b) passing said pipe through an aligning zone containing a pipe rotating means in contact with said pipe;
   c) passing said pipe through a viewing zone having at least one sensor capable of detecting said stripe such that when said sensor detects said stripe, said sensor generates a signal;
   d) transmitting said signal from said sensor to said pipe rotating means;
   e) activating said pipe rotating means in response to said signal such that said pipe is rotated so that said sensor no longer detects said stripe; and
   f) printing onto said pipe in a printing zone wherein said pipe rotating means, and said at least one sensor operate to prevent printing on said stripe.

2. A process for printing, in a printing zone, onto a pipe having at least two longitudinal stripes, comprising:
   a) passing said pipe through an aligning zone containing a pipe rotating means in contact with said pipe;
   b) passing said pipe through a viewing zone having at least a first sensor and a second sensor, each sensor being capable of detecting said stripes such that when said first sensor detects a stripe, a first signal is generated and when said second sensor detects a stripe, a second signal is generated;
   c) transmitting said first signal to said pipe rotating means;
   d) activating said pipe rotating means in response to said first signal such that said pipe is rotated about its longitudinal axis in a first direction to maintain a pre-determined orientation of said pipe in said printing zone;
   e) transmitting said second signal to said pipe rotating means;
   f) activating said pipe rotating means in response to said second signal such that said pipe is rotated about its longitudinal axis in a second direction, said second direction being opposite said first direction, to maintain said pre-determined orientation of said pipe in said printing zone;

g) passing said pipe through said printing zone; and h) printing onto said pipe in said printing zone said pipe having said pre-determined orientation sufficient to prevent printing on said stripes.

3. A process according to claim 2, further comprising before step (a) and (d), extruding a first resin material and a second resin material in an extruder to form said pipe such that it is composed of said first resin material and said stripes are composed of said second resin material, and, thereafter, cooling said pipe.

4. An apparatus comprising:

an extruder for extruding a polymer pipe of a first color having a longitudinal axis and having at least one stripe of a second color running substantially parallel to the longitudinal axis;

cooling means for receiving said pipe from the extruder and cooling said pipe;

pipe rotating means for receiving said pipe from said cooler and rotating said pipe;

sensor means for detecting said stripe and transmitting a signal to said pipe rotating means such that when said sensor detects said stripe, said pipe rotating means rotates said pipe in response to said signal so that said sensor no longer detects said stripe; and printing means for printing on said pipe wherein said pipe rotating means and said sensor means operate to prevent said printing means from printing on said stripe.

5. An apparatus according to claim 4 wherein said sensor means comprises at least a first sensor and a second sensor such that when said first sensor detects said stripe, said first sensor sends a first signal to said pipe rotating means and in response to said first signal, said pipe rotating means rotates said pipe in a first direction and when said second sensor detects said stripe, said second sensor sends a second signal to said pipe rotating means and in response to said second signal said pipe rotating means rotates said pipe in a second direction, opposite to said first direction.

6. A process according to claim 1 wherein said pipe rotating means and said at least one sensor operate such that the resulting print on the surface of said pipe runs extensively linear and extensively parallel to the longitudinal axis of said pipe.

7. A process according to claim 6 wherein said pipe rotating means and said at least one sensor operate such that the resulting print on the surface of said pipe runs extensively linear and extensively parallel to the longitudinal axis of said pipe.

* * * * *